United States Patent
Kim et al.

(10) Patent No.: US 10,582,449 B2
(45) Date of Patent: Mar. 3, 2020

(54) INTRA-PDDU POWER SAVING IN WLAN

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/840,676

(22) Filed: Dec. 13, 2017

(65) Prior Publication Data

US 2018/0167879 A1   Jun. 14, 2018

Related U.S. Application Data

(63) Continuation of application No. 62/433,795, filed on Dec. 14, 2016.

(51) Int. Cl.
| | |
|---|---|
| *H04W 52/02* | (2009.01) |
| *H04W 88/08* | (2009.01) |
| *H04W 88/02* | (2009.01) |
| *H04W 84/12* | (2009.01) |

(52) U.S. Cl.
CPC ....... *H04W 52/0209* (2013.01); *H04W 52/02* (2013.01); *H04W 52/0229* (2013.01); *H04W 84/12* (2013.01); *H04W 88/02* (2013.01); *H04W 88/08* (2013.01); *Y02D 70/00* (2018.01); *Y02D 70/10* (2018.01); *Y02D 70/14* (2018.01); *Y02D 70/142* (2018.01); *Y02D 70/22* (2018.01)

(58) Field of Classification Search
CPC ............ H04W 52/0209; H04W 52/02; H04W 52/0229; H04W 84/12; H04W 88/02; H04W 88/08; H04W 74/006; H04W 52/0219; Y02D 70/14; Y02D 70/142
See application file for complete search history.

(56) References Cited

U.S. PATENT DOCUMENTS

| | | | |
|---|---|---|---|
| 2013/0176921 A1* | 7/2013 | Chu | H04W 52/0206 370/311 |
| 2013/0315141 A1* | 11/2013 | Homchaudhuri | H04W 88/06 370/328 |
| 2015/0036673 A1* | 2/2015 | Asterjadhi | H04W 28/065 370/338 |
| 2016/0057657 A1* | 2/2016 | Seok | H04L 69/324 370/476 |
| 2016/0127020 A1* | 5/2016 | Abraham | H04B 7/0452 370/312 |
| 2016/0192351 A1* | 6/2016 | Kwon | H04W 72/0413 370/329 |
| 2017/0041889 A1* | 2/2017 | Liu | H04W 52/0229 |
| 2017/0048048 A1* | 2/2017 | Seok | H04L 5/0055 |
| 2017/0064718 A1* | 3/2017 | Bharadwaj | H04W 72/0493 |

(Continued)

*Primary Examiner* — Kibrom T Hailu
(74) *Attorney, Agent, or Firm* — Dentons US LLP (57) ABSTRACT

A method and an apparatus for a station (STA) to save power in a wireless local area network (WLAN) are provided. For this, the STA receives a MU PPDU (Multi-User Physical Protocol Data unit) comprising A-MPDU (Aggregated MAC Protocol Data Unit) from an AP (Access Point). The STA enters into a doze state until an end of the MU PPDU, when a receiver address of the A-MPDU is equal to the STA's address, and there is an indication indicating a start of EOF (End-Of-Frame) padding.

8 Claims, 9 Drawing Sheets

(56) References Cited

U.S. PATENT DOCUMENTS

| | | | |
|---|---|---|---|
| 2017/0127404 A1* | 5/2017 | Merlin | H04W 72/0413 |
| 2017/0150493 A1* | 5/2017 | Seok | H04B 7/0452 |
| 2017/0367129 A1* | 12/2017 | Yang | H04L 69/22 |
| 2018/0014327 A1* | 1/2018 | Park | H04W 74/0808 |

* cited by examiner

INTRA-PDDU POWER SAVING IN WLAN

CROSS REFERENCE

This application claims the benefit of U.S. Provisional Patent Application No. 62/433,795, filed on Dec. 14, 2016, which is hereby incorporated by reference as if fully set forth herein.

BACKGROUND OF THE INVENTION

Field of the Invention

The present invention relates to improved intra-PPDU power saving procedures in a wireless local area network (WLAN). More specifically, the present invention provides improved power saving mechanisms for additionally save power for MU (Multi-User) operation.

Discussion of the Related Art

Standards for WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

The station (STA) capable of supporting IEEE 802.11n is officially called as HT (High Throughput) STA. The STA capable of supporting IEEE 802.11ac is officially called as VHT (Very High Throughput) STA. And, the STA capable of supporting IEEE 802.11ax is officially called as HE (High Efficiency) STA.

In the HE system, there are needs for uplink and downlink multi-user (UL MU and DL MU) transmission for various purposes. The present invention is directed to provide improved power saving mechanism considering this MU transmission.

SUMMARY OF THE INVENTION

To achieve these objects and other advantages and in accordance with the purpose of the invention, as embodied and broadly described herein, a method for a station (STA) to save power in a wireless local area network (WLAN), the method comprising: receiving a MU PPDU (Multi-User Physical Protocol Data unit) comprising A-MPDU (Aggregated MAC Protocol Data Unit) from an AP (Access Point); and entering into a doze state until an end of the MU PPDU, when a receiver address of the A-MPDU is equal to the STA's address, and there is an indication indicating a start of EOF (End-Of-Frame) padding, is provided.

The STA may also enter into the doze state, when a second criteria met, wherein the second criteria is met when the MU PPDU is an intra-BASS (Basic Service Set) frame and the MU PPDU is not intended for the STA.

Here, the second criteria may be met, when a reception vector parameter, BSS_COLOR, of the MU PPDU is a BSS color of a BSS (Basic Service Set) with which the STA is associated, the reception vector parameter, UL_FLAG, is 0, and the reception vector parameter, STA_ID_LIST, does not include the STA's identifier or a broadcast identifier intended for the STA.

The MU PPDU may comprise a HE (High Efficiency) MU PPDU.

The indication indicating the start of EOF padding may comprise: a A-MPDU delimeter with EOF equal to 1 and MPDU length field equal to 0.

In another aspect of the present application, a method for a station (STA) to save power in a wireless local area network (WLAN), the method comprising: receiving a MU PPDU (Multi-User Physical Protocol Data unit) comprising A-MPDU (Aggregated MAC Protocol Data Unit) from an AP (Access Point); entering into a doze state until an end of the MU PPDU, when the MU PPDU is an intra-BSS (Basic Service Set) frame and the MU PPDU is not intended for the STA; and further entering into the doze state until the end of the MU PPDU, when the A-MPDU is intended for the STA and there is an indication indicating a start of EOF (End-Of-Frame) padding, is provided.

The indication indicating the start of EOF padding may comprise: a A-MPDU delimeter with EOF equal to 1 and MPDU length field equal to 0.

In another aspect of the present application, a station (STA) configured to save power in a wireless local area network (WLAN), the STA comprising: a transceiver configured to receive a MU PPDU (Multi-User Physical Protocol Data unit) comprising A-MPDU (Aggregated MAC Protocol Data Unit) from an AP (Access Point); and a processor configured to determine whether a receiver address of the A-MPDU is equal to the STA's address, and whether there is an indication indicating a start of EOF (End-Of-Frame) padding, wherein the processor enter into a doze state until an end of the MU PPDU, when the receiver address of the A-MPDU is equal to the STA's address, and there is the indication indicating the start of EOF padding, is provided.

Here, the processor may also enter into the doze state, when a second criteria met, wherein the second criteria is met when the MU PPDU is an intra-BSS (Basic Service Set) frame and the MU PPDU is not intended for the STA.

The second criteria can be met, when a reception vector parameter, BSS_COLOR, of the MU PPDU is a BSS color of a BSS (Basic Service Set) with which the STA is associated, the reception vector parameter, UL_FLAG, is 0, and the reception vector parameter, STA_ID_LIST, does not include the STA's identifier or a broadcast identifier intended for the STA.

The MU PPDU may comprise a HE (High Efficiency) MU PPDU.

The indication indicating the start of EOF padding may comprise: a A-MPDU delimeter with EOF equal to 1 and MPDU length field equal to 0.

In another aspect of the present invention, a station (STA) to save power in a wireless local area network (WLAN), the STA comprising: a transceiver configured to receive a MU PPDU (Multi-User Physical Protocol Data unit) comprising A-MPDU (Aggregated MAC Protocol Data Unit) from an AP (Access Point); a processor configured to enter into a doze state until an end of the MU PPDU, when the MU PPDU is an intra-BSS (Basic Service Set) frame and the MU PPDU is not intended for the STA; and wherein the processor further enters into the doze state until the end of the MU PPDU, when the A-MPDU is intended for the STA and there is an indication indicating a start of EOF (End-Of-Frame) padding, is provided.

The indication indicating the start of EOF padding may comprise: a A-MPDU delimeter with EOF equal to 1 and MPDU length field equal to 0.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description is given for improved acknowledgement procedures in WLAN. For this purpose, a WLAN system to which the present invention is applied will first be described.

Figure 1:
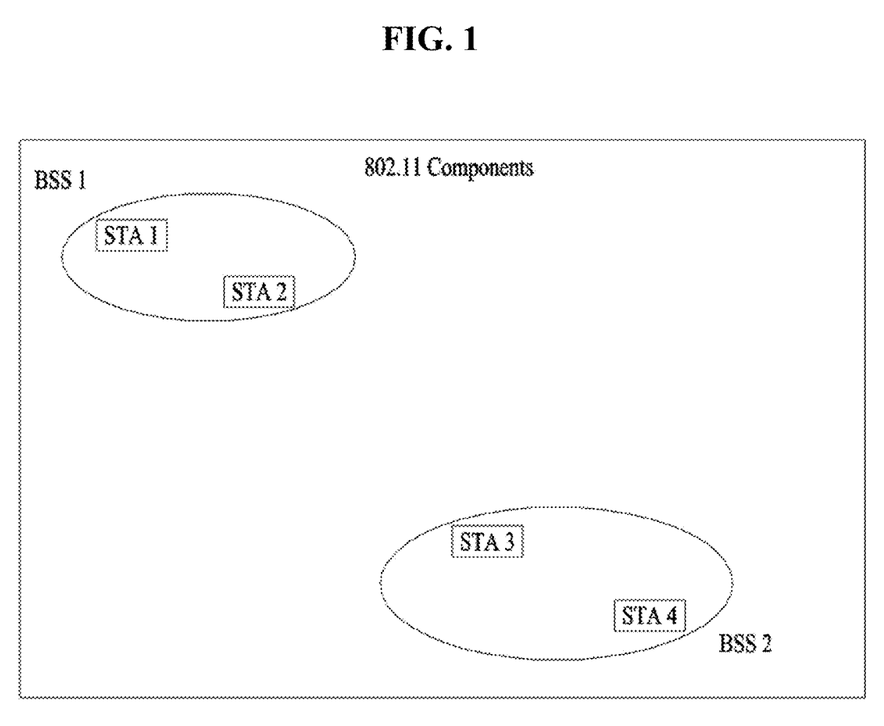
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
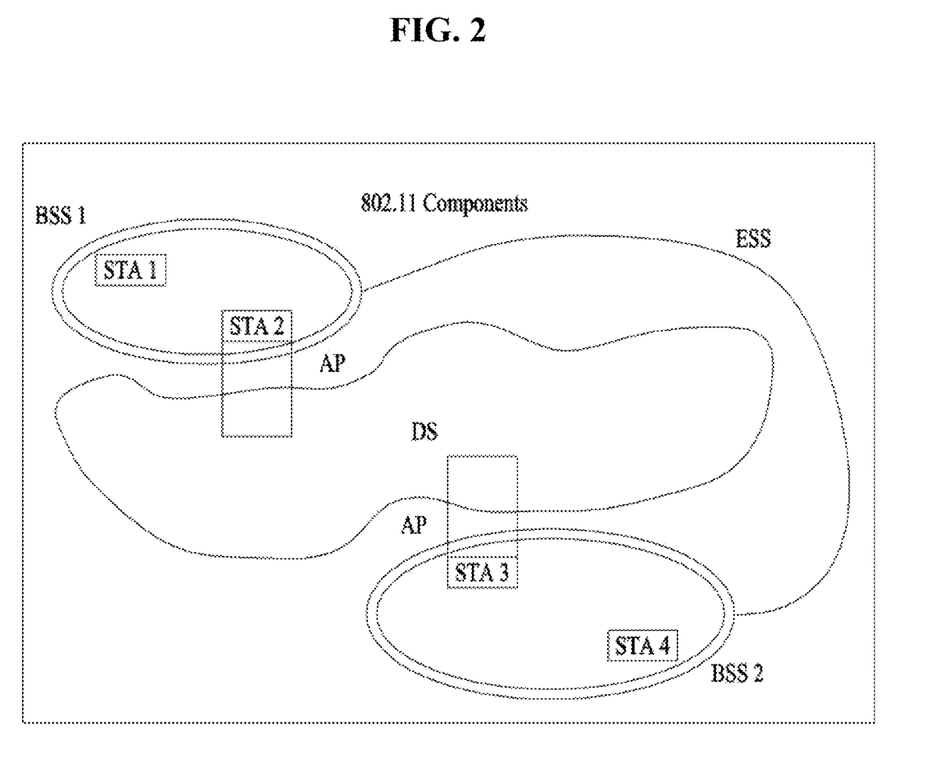
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
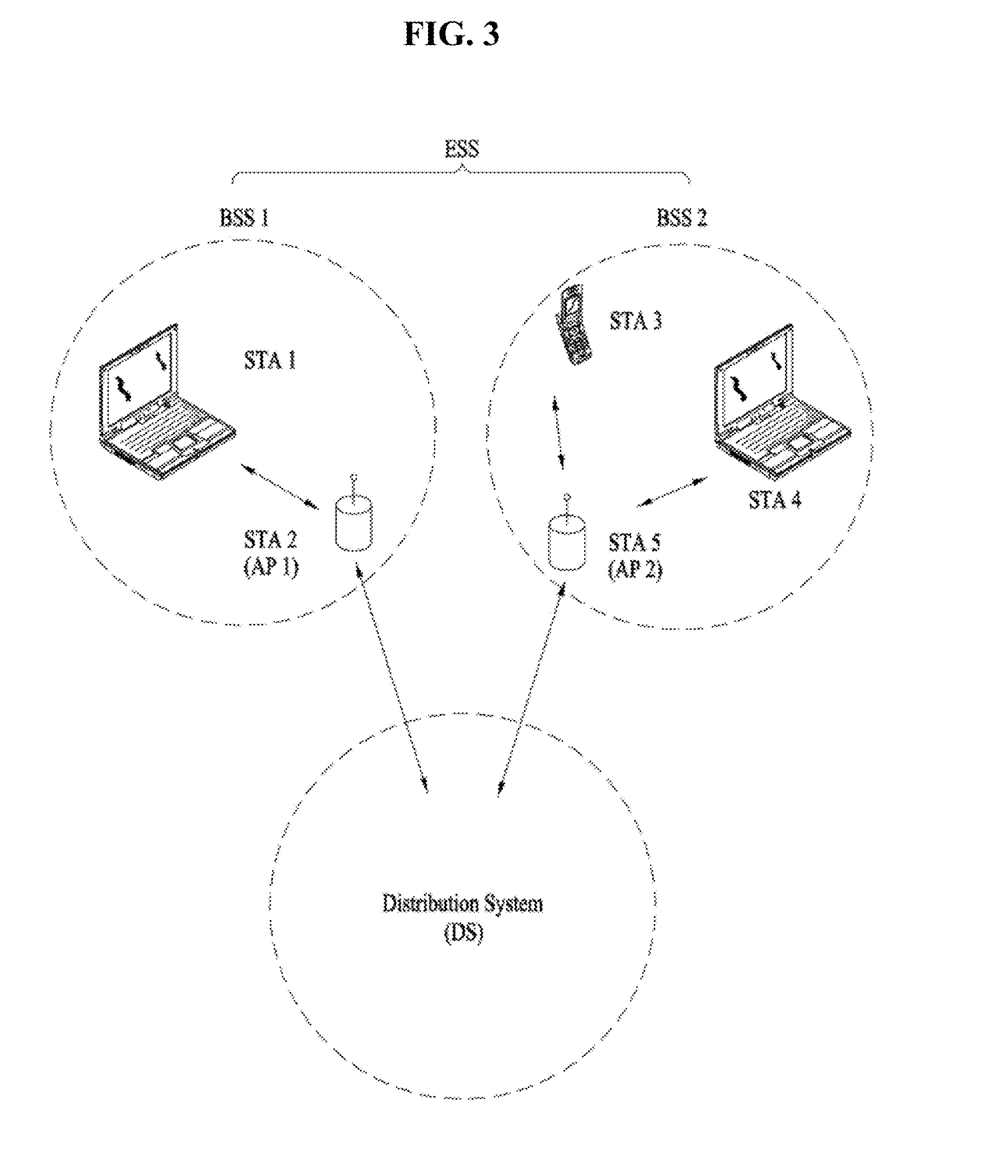
FIG. 3 illustrates an exemplary configuration of a WLAN system.

FIG. 3 illustrates an exemplary configuration of a WLAN system. In FIG. 3, an exemplary infrastructure BSS including a DS is illustrated.

In the example of FIG. 3, an ESS includes BSS1 and BSS2. In the WLAN system, an STA is a device complying with Medium Access Control/Physical (MAC/PHY) regulations of Institute of Electrical and Electronics Engineers (IEEE) 802.11. STAs are categorized into AP STAs and non-AP STAs. The non-AP STAs are devices handled directly by users, such as laptop computers and mobile phones. In FIG. 3, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Various UL and DL MU transmission schemes in HE WLAN are explained as following.

Figure 4:
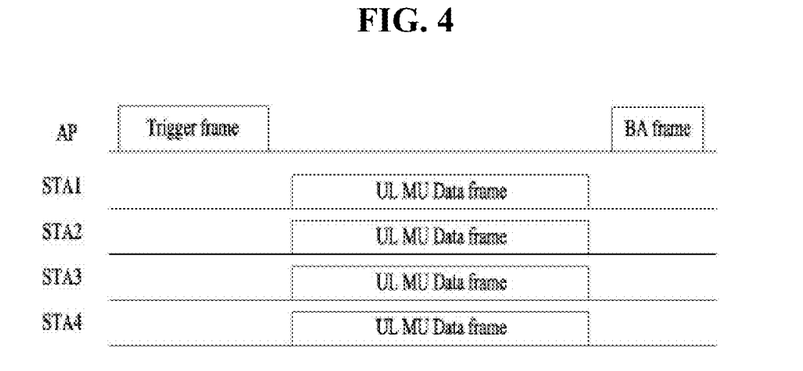
FIG. 4 is a view illustrating uplink multi-user (UL MU) transmission.

FIG. 4 is a view illustrating uplink multi-user (UL MU) transmission.

The AP may acquire a TXOP to access a medium, and transmit a signal by occupying the medium through contention. Referring to FIG. 4, the AP STA may transmit a trigger frame to a plurality of STAs to perform UL MU transmission. In this case, the trigger frame may include, for example, information about a resource allocation position and size, IDs of the STAs, MCS, and MU type (=MIMO, OFDMA) as UL MU allocation information. That is, the trigger frame transmitted by the AP STA to the plurality of STAs may be a frame allowing the plurality of STAs to perform UL data transmissions.

The plurality of STAs may transmit data to the AP after an SIFS elapses based on a format indicated by the trigger frame. The AP may then send ACK/NACK information to the STAs, and thus the STAs may perform UL MU transmissions.

As stated above, the Trigger frame is used to allocate resource for UL MU transmission and to solicit an UL MU transmission at specific time after the PPDU that carries the Trigger frame. The Trigger frame also carries other information required by the responding STA to send UL MU.

Figure 5:
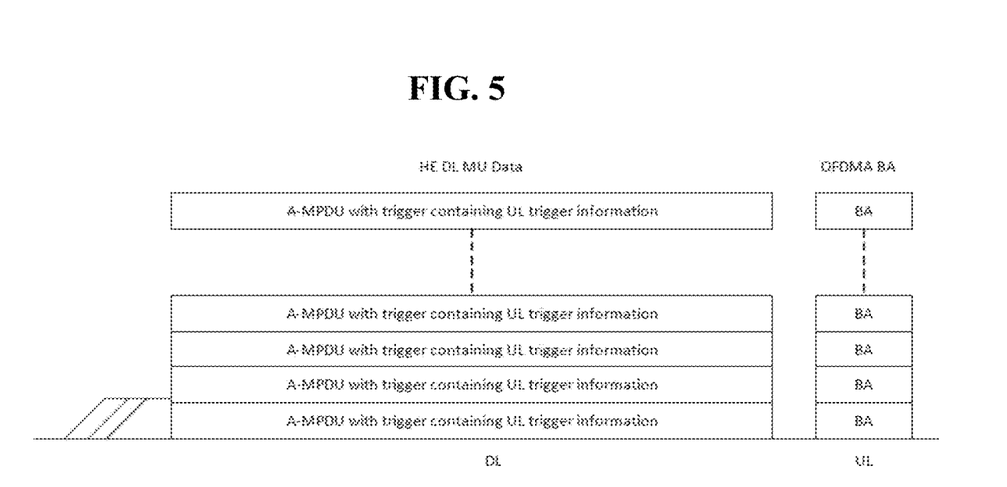
FIG. 5 is a view illustrating downlink multi-user (DL MU) transmission.

FIG. 5 is a view illustrating downlink multi-user (DL MU) transmission.

AP STA may transmit HE DL MU data in a format of A-MPDU as shown in FIG. 5. A non-AP STA that is the recipient, within an HE MU PPDU may send the immediate response according to the scheduling information defined by the UL trigger information that is carried in A-MPDU with trigger containing UL trigger-information. The non-AP STA may respond with BA format as shown in FIG. 5.

HE DL MU operation allows an AP to transmit simultaneously to one or more non-AP STAs in DL OFDMA, DL MU-MIMO or both. An AP may not transmit to a STA an HE MU PPDU with an HE-SIG-B field allocating spatial streams to more than one recipient STA, unless the STA sets the Downlink MU-MIMO On Partial Band-width Rx subfield of the HE Capabilities element to 1. The transmission on each RU in an HE MU PPDU shall be padded to end at the same time, indicated by the L-SIG field (L-SIG). The padding procedure for each A-MPDU in an HE MU PPDU is explained below. A STA may not transmit a DL OFDMA with MIMO PPDU that contains a unicast RA that corresponds to a STA from which it has not received an HE Capabilities element with the Partial Bandwidth DL MU-MIMO subfield in the HE PHY Capabilities Information field set to 1.

Based on these MU transmissions in mind, the intra-PPDU power saving mechanism is explained.

Intra-PPDU Power Saving

Intra-PPDU power save is the power save mechanism for an HE STA to enter the doze state until the end of a received PPDU which is identified as an Intra-BSS frame by the below conditions listed below. A non-AP HE STA that has dot11IntraPPDUPowerSaveOptionActivated equal to true operates in intra-PPDU power save mode.

Figure 6:
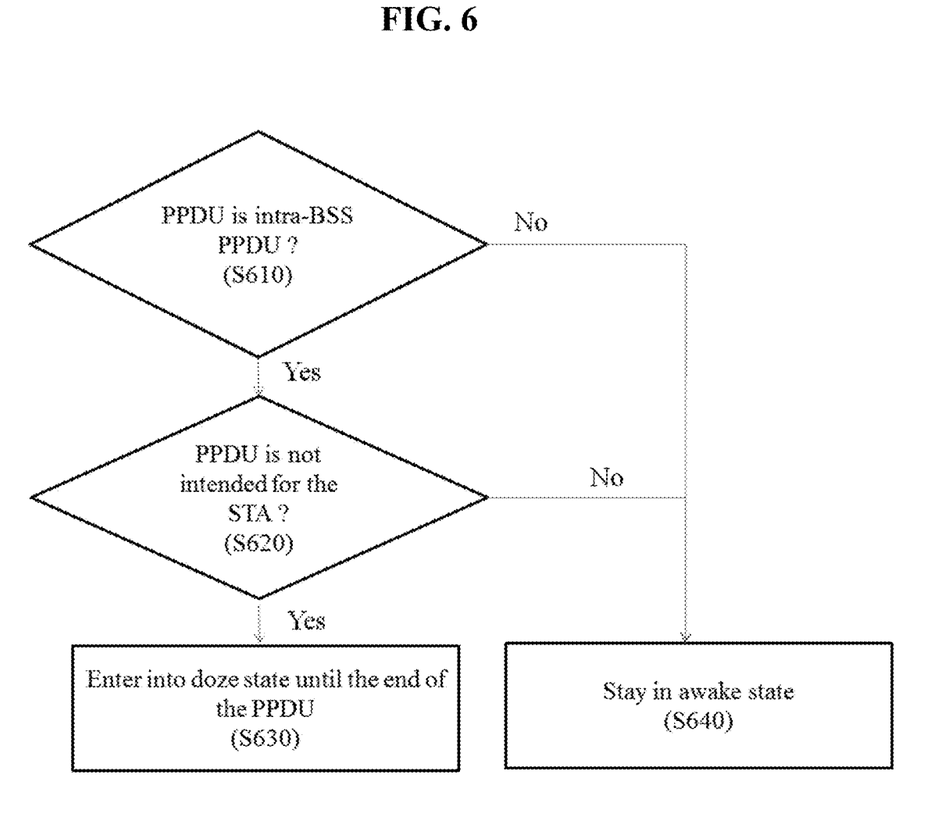
FIG. 6 is a flow diagram for explaining the intra-PPDU power saving mechanism according to one embodiment of the present invention.

FIG. 6 is a flow diagram for explaining the intra-PPDU power saving mechanism according to one embodiment of the present invention.

When the STA that is in intra-PPDU power save mode receives PPDU, the STA may determine whether the received PPDU is intra-BSS PPDU or not (S610). The STA may determine this based on various ways, but one common way is checking the reception vector of the PPDU (RXVEC-TOR) parameter, BSS_COLOR. If the BSS_COLOR is the BSS color of the BSS with which the STA is associated, the STA determines that the received PPDU is intra-BSS PPDU.

The STA may also determine whether the PPDU is intended for the STA (S620). The way of determining this depends on the format of the PPDU, but one common way is determining whether the receiver address of the PPDU is the STA's address.

If the answers to the both of the determinations are 'yes', the STA may enter into the doze state until the end of the PPDU (S630). If not, the STA may stay in awake state (S640).

Figure 7:
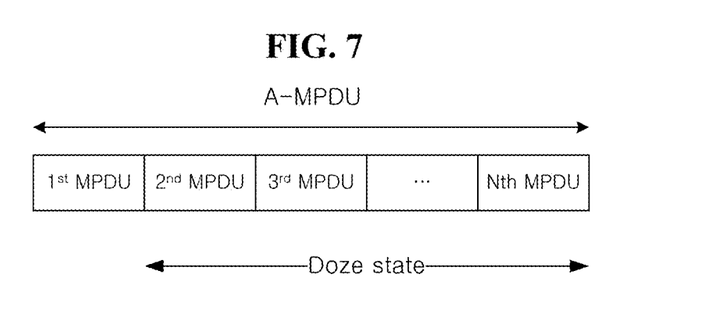
FIG. 7 shows an example of the STA's intra-PPDU power saving operation.

FIG. 7 shows an example of the STA's intra-PPDU power saving operation.

As shown in FIG. 7, when the STA receives A-MPDU with multiple MPDUs, the STA may first decode the $1^{st}$ MPDU among the multiple MPDUs. If the STA determines that the A-MPDU is intra-BSS frame, and it is not for the STA, the STA may enter into the doze state from $2^{nd}$ MPDU to the end of the frame.

As stated above, the conditions for intra-PPDU power saving may defer from each other for various PPDU formats. Followings are the examples of these mechanisms.

A non-AP HE STA that is in intra-PPDU power save mode may enter the doze state until the end of a PPDU currently being received when one of the following conditions is met:

The PPDU is an HE MU PPDU where the RXVECTOR parameter BSS_COLOR is the BSS color of the BSS with which the STA is associated, the RXVECTOR parameter UL_FLAG is 0 and the RXVECTOR parameter STA_ID_LIST does not include the identifier of the STA or the broadcast identifier(s) intended for the STA and the BSS Color Disabled subfield is 0 in the most recently received HE Operation element from the AP to which it is associated.

The PPDU is an HE MU PPDU, HE SU PPDU or HE ER SU PPDU and one of the following conditions are true:

The RXVECTOR parameter BSS_COLOR is the BSS color of the BSS with which the STA is associated, the RXVECTOR parameter UPLINK_FLAG is 1 and the BSS Color Disabled subfield is 0 in the most recently received HE Operation element from the AP to which it is associated.

The RXVECTOR parameter BSS_COLOR is the BSS color of the BSS with which the STA is associated, the RXVECTOR parameter UL_FLAG is 0 and a PHY-RXEND.indication(UnsupportedRate) primitive was received and the BSS Color Disabled subfield is 0 in the most recently received HE Operation element from the AP to which it is associated.

The PPDU is an HE TB PPDU where the RXVECTOR parameter BSS_COLOR is the BSS color of the BSS with which the STA is associated and the BSS Color Disabled subfield is 0 in the most recently received HE Operation element from the AP to which it is associated.

The PPDU is a VHT PPDU where the RXVECTOR parameter PARTIAL_AID is the BSSID [39:47] of the BSS with which the STA is associated and the RXVECTOR parameter GROUP_ID is 0.

Improved Intra-PPDU Power Saving

As explained above, intra-PPDU power saving provides power saving mechanism for the STA to enter into the doze state, when the received PPDU is intra-BSS PPDU and that PPDU is not for the STA. However, there is a way to save more power for the STA to receive MU PPDUs.

Figure 8:
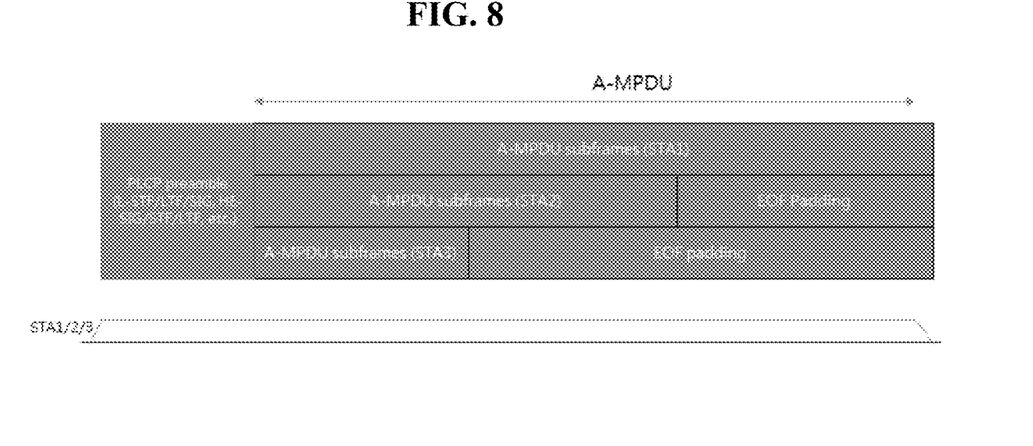
FIG. 8 shows an example of receiving MU PPDU by multiple STAs and operation of them according to the intra-PPDU power saving mechanism.

FIG. 8 shows an example of receiving MU PPDU by multiple STAs and operation of them according to the intra-PPDU power saving mechanism.

In this example, DL MU PPDU has A-MPDUs for STAs 1-3. In order to align the A-MPDU subframes for STAs 1-3, there can be EOF (End-Of-Frame) paddings. In this example, EOF paddings are present for STAs 2-3.

According to the above explained intra-PPDU power saving, this MU PPDU is intra-BSS PPDU, but it is intended for STAs 2-3. Thus, STAs 2-3 cannot enter into the doze state, which can be a waste of power.

Therefore, one embodiment of the present invention proposes additional condition for intra-PPDU power saving to save this wasted power.

Figure 9:
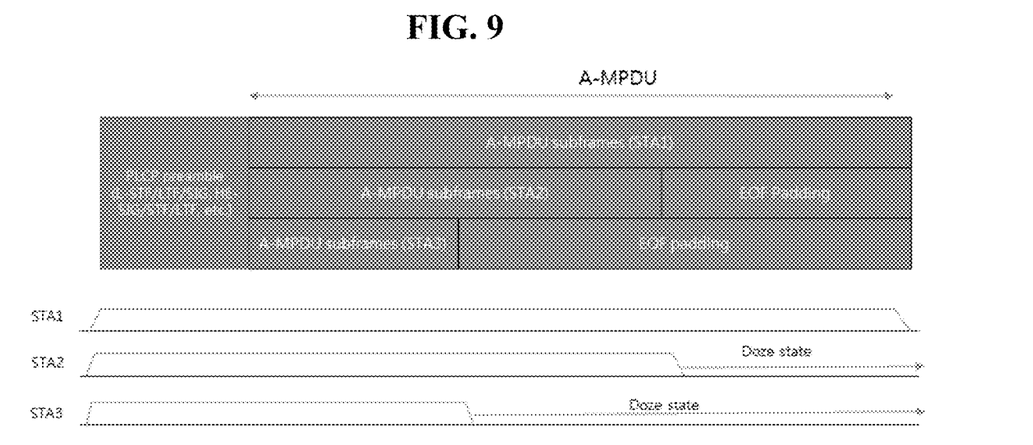
FIG. 9 shows the concept of one embodiment employing the improved intra-PPDU power saving.

FIG. 9 shows the concept of one embodiment employing the improved intra-PPDU power saving.

According to this embodiment, STAs 2-3 may enter into the doze state when they encounter the indication indicating the start of EOF padding. Since the STA 3 encounters the EOF padding earlier than the STA 2, the STA 3 may enters into the doze state earlier than the STA 2.

The criteria for this additional power saving can be as following.

Figure 10:
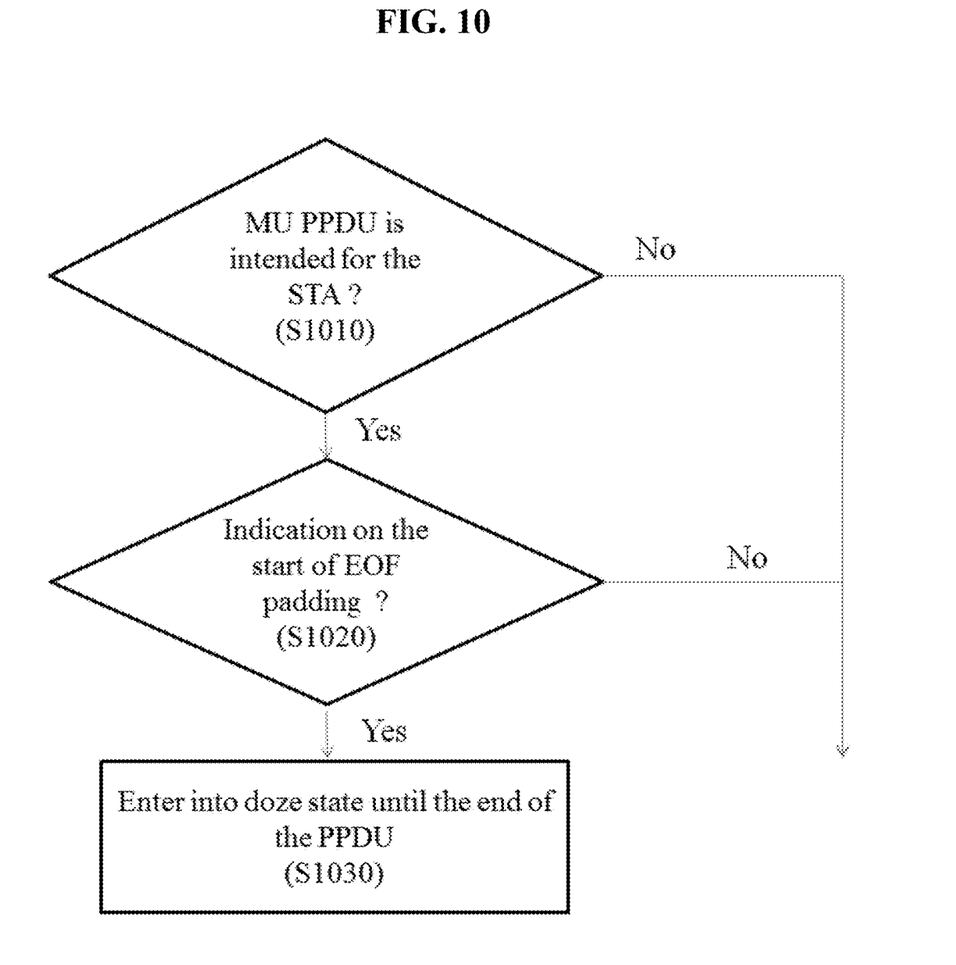
FIG. 10 is a flow diagram for the STA according to one embodiment of the present invention.

FIG. 10 is a flow diagram for the STA according to one embodiment of the present invention.

When the STA receives MU PPDU, the STA may determine whether the received MU PPDU is intended for the STA (S1010). If so, the STA may further determine whether there is an indication on the start of EOF padding (S1020). If there is the indication, the STA may enter into the doze state until the end of the received MU PPDU (S1030). If not, the STA may determine other criteria according to other intra-PPDU power saving mechanism.

The indication on the start of EOF padding can be identified based on the following structure.

Figure 11:
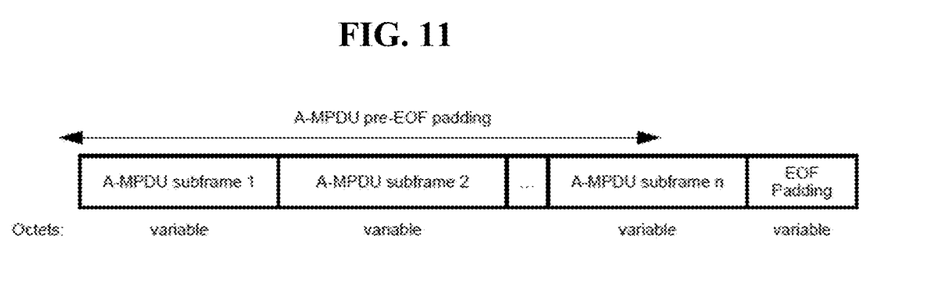
FIGS. 11-13 show a format of A-MPDU according to one embodiment of the present invention.
Figure 12:
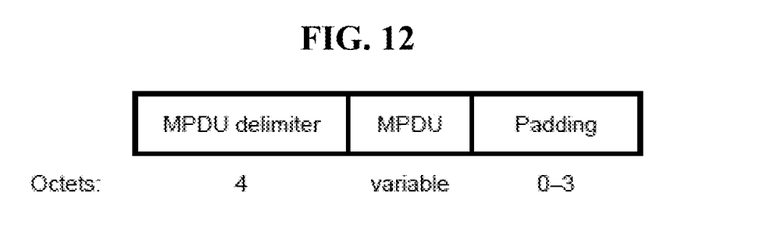
Figure 13:
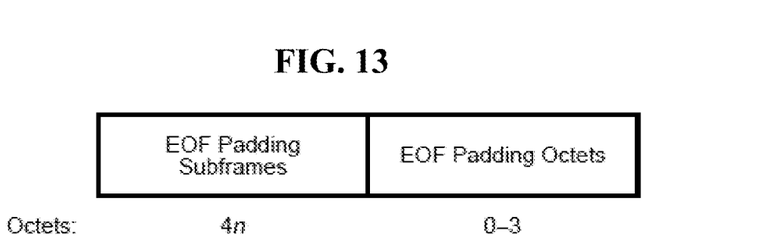

FIGS. 11-13 show a format of A-MPDU according to one embodiment of the present invention.

An A-MPDU consists of a sequence of one or more A-MPDU subframes and a variable amount of EOF padding as shown in FIG. 11.

The structure of the A-MPDU subframe is shown in FIG. 12. Each A-MPDU subframe consists of an MPDU delimiter optionally followed by an MPDU. Each nonfinal A-MPDU subframe in an A-MPDU has padding octets appended to make the subframe a multiple of 4 octets in length. The content of these octets is unspecified.

In an HT PPDU, the final A-MPDU subframe is not padded.

The EOF Padding field is shown in FIG. 13. This is present in a VHT PPDU or HE PPDU.

The EOF Padding Subframes subfield contains zero or more EOF padding subframes. An EOF padding subframe is an A-MPDU subframe with 0 in the MPDU Length field and 1 in the EOF field.

EOF field can represent the following.

EOF is End of frame indication. It may be set to 1 in an A-MPDU subframe that has 0 in the MPDU Length field and that is used to pad the A-MPDU in a VHT or HE PPDU. It may be set to 1 in the MPDU delimiter of an S-MPDU and set to 1 in a MPDU delimiter preceding a QoS Data frame or Action frame soliciting an Ack frame in response that are contained in an ack-enabled multi-TID A-MPDU. It may be set to 0 otherwise.

Based on this explanation, one preferred embodiment propose the following intra-PPDU power saving mechanism.

A non-AP HE STA that is in intra-PPDU power save mode may enter the doze state until the end of a PPDU currently being received when the following condition is met:

The PPDU is either an HE MU PPDU with the RXVECTOR parameter UL_FLAG set to 0 or a VHT MU PPDU containing an A-MPDU with The RA(s) in the A-MPDU is(are) equal to the STA's individual address and, The STA has received in the A-MPDU at least one MPDU delimiter with EOF equal to 1 and with MPDU length field equal to 0.

Figure 14:
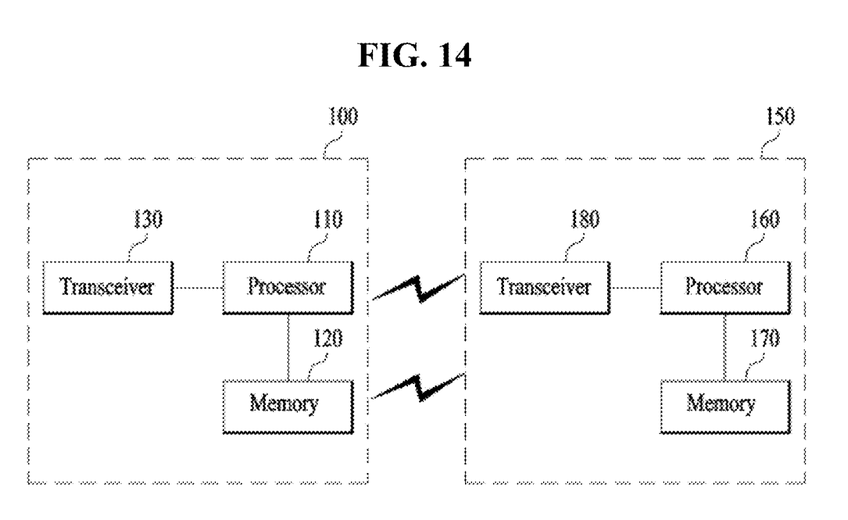
FIG. 14 is a block diagram of apparatuses for performing the above-described methods.

FIG. 14 is a block diagram of apparatuses for performing the above-described methods.

Referring to FIG. 14, a wireless apparatus 100 may be the afore-described specific STA, and a wireless apparatus 150 may be the afore-described AP.

The STA 100 may include a processor 110, a memory 120, and a transceiver 130. The AP 150 may include a processor 160, a memory 170, and a transceiver 180. The transceivers 130 and 180 may transmit and receive wireless signals and may be implemented in an IEEE 802.11/3GPP physical layer. The processors 110 and 160 may be implemented in the physical layer and/or the MAC layer and connected to the transceivers 130 and 180. The processors 110 and 160 may perform the forgoing SR operation.

The processors 110 and 160 and/or the transceivers 130 and 180 may include Application-Specific Integrated Circuit (ASICs), other chip sets, logic circuits, and/or data processors. The memories 120 and 170 may include Read Only Memories (ROMs), Random Access Memories (RAMs), flash memories, memory cards, storage media, and/or other storage units. If an embodiment is implemented in software, the above-described methods may be performed in a module (e.g., a process or a function) performing the afore-described functions. The module may be stored in the memories 120 and 160 and executed by the processors 110 and 160. The memories 120 and 170 may reside inside or outside the processors 110 and 160 and may be connected to the processors 110 and 160 by well-known means.

As is apparent from the foregoing description, control information can be efficiently transmitted in a multi-user radio frame.

While the present invention has been described above in the context of an IEEE 802.11 WLAN system, the present invention is not limited thereto. The present invention is applicable in the same manner to various wireless systems in which an AP may transmit a frame including control information for a plurality of STAs.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for a station (STA) in a wireless local area network (WLAN), the method comprising:

receiving a Multi-User Physical layer Protocol Data Unit (MU-PPDU);

determining whether to enter a doze state based on whether a reception vector parameter in the MU-PPDU is a Basic Service Set (BSS) color of a BSS associated with the STA and the MU-PPDU is not intended for the STA;

determining whether to enter a doze state based on whether a receiver address (RA) field of an Aggregated-Medium access control layer Protocol Data Unit (A-MPDU) included in the MU-PPDU is an address of the STA, an uplink (UL) flag of the MU-PPDU is set to zero, and the MU-PPDU includes an End-Of-Frame (EOF) padding, wherein the UL flag of the MU-PPDU is set to zero when the MU-PPDU is used for downlink (DL) transmission;

entering the doze state until an end of the MU-PPDU when the reception vector parameter is the BSS color and the MU-PPDU is not intended for the STA; and entering the doze state until an end of the MU-PPDU when the RA is the address of the STA, the UL flag of the MU-PPDU is set to zero, and the MU-PPDU includes the EOF padding.

2. The method of claim 1, wherein when MU-PPDU is not intended for the STA, the reception vector parameter (STA_ID_LIST) does not include an identifier of the STA or a broadcast identifier intended for the STA.

3. The method of claim 1, wherein the EOF padding includes an A-MPDU delimeter with an EOF equal to 1 and an MPDU length field equal to 0.

4. The method of claim 1, wherein the MU PPDU comprises a plurality of data fields received based on a plurality of frequency resource units, a signal field including allocation information of the frequency resource units, and user identification information of the frequency resource units.

5. A station (STA) in a wireless local area network (WLAN), the STA comprising:
 a transceiver;
 a memory; and
 a processor, operatively coupled to the transceiver and the memory, wherein the processor is configured to:
 control the transceiver to receive a Multi User-Physical layer Protocol Data Unit (MU-PPDU);
 determine whether to enter a doze state based on whether a reception vector parameter in the MU-PPDU is a Basic Service Set (BSS) color of a BSS associated with the STA and the MU-PPDU is not intended for the STA;
 determine whether to enter the doze state based on whether a receiver address (RA) field of an Aggregated-Medium access control layer Protocol Data Unit (A-MPDU) included in the MU-PPDU is an address of the STA, an uplink (UL) flag of the MU-PPDU is set to zero, and the MU-PPDU includes an End-Of-Frame (EOF) padding,
 wherein the UL flag of the MU-PPDU is set to zero when the MU-PPDU is used for downlink (DL) transmission;
 enter the doze state until an end of the MU-PPDU when the reception vector parameter is the BSS color and the MU-PPDU is not intended for the STA; and
 enter the doze state until the end of the MU-PPDU when the RA is the address of the STA, the UL flag of the MU-PPDU is set to zero, and the MU-PPDU includes the EOF padding.

6. The STA of claim 5, wherein when MU-PPDU is not intended for the STA, the reception vector parameter (STA_ID_LIST) does not include an identifier of the STA or a broadcast identifier intended for the STA.

7. The STA of claim 5, wherein the EOF padding includes an A-MPDU delimeter with an EOF equal to 1 and an MPDU length field equal to 0.

8. The STA of claim 5, wherein the MU PPDU comprises a plurality of data fields received based on a plurality of frequency resource units, a signal field including allocation information of the frequency resource units, and user identification information of the frequency resource units.

\* \* \* \* \*